(12) United States Patent
Sharma et al.

(10) Patent No.: US 12,486,515 B2
(45) Date of Patent: Dec. 2, 2025

(54) RECOMBINANT VECTOR FOR HIGH-EXPRESSION OF PROTEINS IN YEASTS

(71) Applicant: COUNCIL OF SCIENTIFIC & INDUSTRIAL RESEARCH, New Delhi (IN)

(72) Inventors: Deepak Kumar Sharma, Chandigarh (IN); Debendra Kumar Sahoo, Chandigarh (IN); Pradeep Kumar, Chandigarh (IN); Laxmi Swami, Chandigarh (IN); Anubhav Singh Nahar, Chandigarh (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 916 days.

(21) Appl. No.: 17/629,395

(22) PCT Filed: Jul. 24, 2020

(86) PCT No.: PCT/IN2020/050640
§ 371 (c)(1),
(2) Date: Jan. 23, 2022

(87) PCT Pub. No.: WO2021/014470
PCT Pub. Date: Jan. 28, 2021

(65) Prior Publication Data
US 2022/0315936 A1    Oct. 6, 2022

(30) Foreign Application Priority Data
Jul. 25, 2019  (IN) .............................. 201911030001

(51) Int. Cl.
*C12N 15/67* (2006.01)
*C12N 15/10* (2006.01)
*C12N 15/81* (2006.01)

(52) U.S. Cl.
CPC ....... *C12N 15/815* (2013.01); *C12N 15/1034* (2013.01); *C12N 15/67* (2013.01); *C12N 2330/50* (2013.01)

(58) Field of Classification Search
CPC .. C12N 15/815; C12N 15/1034; C12N 15/67; C12N 2330/50
See application file for complete search history.

(56) References Cited

U.S. PATENT DOCUMENTS

| | | | |
|---|---|---|---|
| 8,846,343 B2 | 9/2014 | Akada et al. | |
| 2014/0178933 A1* | 6/2014 | Koo ........................ | C12P 21/02 435/197 |

OTHER PUBLICATIONS

Silveira WB, et al. Genome Announc. Nov. 6, 2014;2(6):e01136-14 (Year: 2014).*
Yarimizu, Tohru, et al. Microbial cell factories 14 (2015): 1-14 (Year: 2015).*
Inokuma K, et. al. Genome Announc. Apr. 23, 2015;3(2):e00389-15 (Year: 2015).*
Zhang J, et al. Bioresour Technol. 2014;152:192-201 (Year: 2014).*
Almeida et al., "Acquisition of flocculation phenotype by *Kluyveromyces marxianus* when overexpressing *GAP1* gene encoding an isoform of glyceraldehyde-3-phosphate dehydrogenase," *Journal of Microbiological Methods*, 55 (2003) 433-440.
Bae et al., "Direct fermentation of Jerusalem artichoke tuber powder for production of l-lactic acid and d-lactic acid by metabolically engineered *Kluyveromyces marxianus*," *Journal of Biotechnology* https://doi.org/10.1016/j.jbiotec.2017.12.001.
Ball et al., "Construction of Efficient Centromeric, Multicopy and Expression Vectors for the Yeast Kluyveromyces marxianus Using Homologous Elements and the Promoter of a Purine-Cytosine-Like Permease," *J. Mol. Microbiol. Biotechnol.* (1999) 1(2): 347-353.
Bergkamp et al., "Expression of an a-galactosidase gene under control of the homologous inulinase promoter in *Kluyveromyces marxianus*," Appl Micro biol Biotechnol (1993) 40: 309-317.
Bierhuizen et al., "Green Fluorescent Protein Variants as Markers of Retroviral-Mediated Gene Transfer in Primary Hematopoietic Cells and Cell Lines," *Biochemical and Biophysical Research Communications* 234, 371-375 (1997).
Curran et al., "Use of High Capacity Terminators in Saccharomyces cerevisiae to Increase mRNA half-life and Improve Gene Expression Control for Metabolic Engineering Applications," *Metab Eng.* Sep. 2013 ; 19: 88-97. doi:10.1016/j.ymben.2013.07.001.
Erijman et al., "Transfer-PCR (TPCR): A highway for DNA cloning and protein engineering," *Journal of Structural Biology* 175 (2011) 171-177.
Fonseca et al., "The yeast Kluyveromyces marxianus and its biotechnological potential," *Appl Microbiol Biotechnol* (2008) 79:339-354 DOI 10.1007/s00253-008-1458-6.
Gao et al., "Efficient ethanol production from inulin by two-stage aerate strategy," *Biomass and Bioenergy* 80 (2015) 10-6.
Gouch et al., "Production of ethanol from molasses at 45 ° C using alginate- immobilized Kluyveromyces marxianus imb3," *Bioprocess Engineering* 16 (1997) 389-392 Ó Springer-Verlag 1997.
Himes et al., "Assays for Transcriptional Activity Based on the Luciferase Reporter Gene," *Assays for Transcriptional Activity*, Himes and Shannon, pp. 165-174.

(Continued)

*Primary Examiner* — Anoop K Singh
*Assistant Examiner* — Zanna Maria Beharry
(74) *Attorney, Agent, or Firm* — Blank Rome LLP (57) ABSTRACT

The current invention relates to recombinant vectors for high protein expression. More particularly, it relates to recombinant vector having promoter sequence and terminator sequence for constitutive expression of homologous and heterologous proteins wherein the promoter sequence is selected from the group consisting of SEQ ID NO: 1 and SEQ ID NO: 2 and terminator sequence having sequence selected from the group consisting of SEQ ID NO: 3 and SEQ ID NO: 4.

15 Claims, 8 Drawing Sheets
Specification includes a Sequence Listing.

(56) References Cited

OTHER PUBLICATIONS

Kim et al., "Enhanced Xylitol Production by Mutant *Kluyveromyces marxianus* 36907-FMEL1 Due to Improved Xylose Reductase Activity," Appl Biochem Biotechnol, Jun. 5, 2015, 10 pp.
Lee et al., "Characterization of Saccharomyces cerevisiae promoters for heterologous gene expression in *Kluyveromyces marxianus*," Appl Microbiol Biotechnol(2013) 97:2029-2041.
Lertwattanasakul et al., "Genetic basis of the highly efficient yeast Kluyveromyces marxianus: complete genome sequence and transcriptome analyses," *Biotechnology for Biofuels*, (2015) 8:47, pp. 1-14.
Liu et al., "Molecular characterization and expression of microbial inulinase genes," Critical Reviews in Microbiology, 2013; 39(2): 152-165.
Nonklang et al., "Construction of Flocculent *Kluyveromyces marxianus* Strains Suitable for High-Temperature Ethanol Fermentation," *Biosci. Biotechnol. Biochem.*, 73 (5), 1090-1095, 2009.
Nonklang et al., "High-Temperature Ethanol Fermentation and Transformation with Linear DNA in the Thermotolerant Yeast *Kluyveromyces marxianus* DMKU3-1042," *Applied and Environmental Microbiology*, Dec. 2008, p. 7514-7521.
Pecota et al., "Sequential gene integration for the engineering of Kluyveromyces marxianus," *Journal of Biotechnology* 127 (2007) 408-416.
Walther et al., "The influence of aeration and hemicellulosic sugars on xylitol production by Candida *tropicalis*," *Bioresource Technology* 76 (2001) 213-220.
Yahg et al., "Characterizing yeast promoters used in *Kluyveromyces marxianus*," *World J. Microbiol Biotechnol*, Jul. 12, 2015, 6 pgs.
Raikumar, Arun S., et al. Biological Parts for Kluyveromyces marxianus Synthetic Biology, Frontiers in Bioengineering and Biotechnology, www.frontiersin.org, Original Research published May 7, 2019, vol. 7, Article. 97.

\* cited by examiner

SEQUENCE LISTING

```
<160> NUMBER OF SEQ ID NOS: 4

<210> SEQ ID NO 1
<211> LENGTH: 1000
<212> TYPE: DNA
<213> ORGANISM: Kluyveromyces marxianus
<220> FEATURE:
<221> NAME/KEY: IMTCP1 promoter
<222> LOCATION: (1)..(1000)
<223> OTHER INFORMATION: IMTCP1 promoter from K. marxianus

<400> SEQUENCE: 1
tacgcttgtt tctccattag gatctcagaa aaacaacgga cactctaaat taaaaacacc      60
aaaataaaaa ttaaatacaa acccagcaaa aaacattcgt ctgaattaga acaggacaaa     120
caaacaaaac taaagaagta ccacgctcta gcgaacgctg cttctctttc ctttttctct     180
ctctactttt gctagtagcc agatacgctt caagcgtctg tctgtttgtt tgattttttt     240
ccctcttcgc ccatcccttt tcaaatcatc gcgtagggaa aatatggctc tggcctctag     300
cctctggacc acacggggca gcattatcta agcccaaatt gggcgagaac gaaaaaaaaa     360
aaactacaca caacgtaact ggagcagtct tttgcttgta aattttcgaa agaaaatatc     420
tttttcttga tttttgcgtt tcttttgtt tcttttttct atctgtttcc acacagatct     480
ctaagccgag atctcttcct gccaggagaa tctgagaatc ttaggatagg aatctctgtt     540
tttttctttg ttttttttt tttttctgg ccccaaggcc tgtgatgcgc gaactgtttc     600
cgtacactga atgaggcgca ttagattcgg gggacaacac cgttaatttc ttttgtttac     660
atgggtcagc ccgctgaggc tttttccct cttttcctgt ttgtgtttct gtgtacggtg     720
acctgcgccc ttttcttaaa gatagattcc tcctttttg ttgttgtttt tggactgctt     780
cctcaggttc tcgctcgata tggctcgcca tttcaggaaa tttatatata aataatgaaa     840
agtcgtttga ctaatgttta cttggctgtt ttccaatatt tcacatatat aataggagtc     900
tttcggtttt ttctggtggt tattttcttc tttacattat acatttgtta attacagatt     960
catatctaaa gcctaaaaaa ccaacacaaa gaagttaaaa                          1000
```

<210> SEQ ID NO 2
<211> LENGTH: 1000
<212> TYPE: DNA
<213> ORGANISM: Kluyveromyces marxianus
<220> FEATURE:
<221> NAME/KEY: IMTCP2 promoter
<222> LOCATION: (1)..(1000)
<223> OTHER INFORMATION: IMTCP2 promoter from k. marxianus

<400> SEQUENCE: 2

```
acaaaacagg acaaaacaaa acaatacagt acacggcacg cgaacctctt tttctccttt      60
tcctgccccc gccacaccga aaacactgg tttctgcacc aagcaacagg caacacacac      120
ggacctagct agaaaaacag tcttgttcag ctggctacca ccgctaccac cgccattagt     180
agtaactaac taagtatgca atatgtaaaa atgtaagcca aaagggaaca acaacaatag    240
taaaaaaaaa aaaaaaaacc cactggtaaa tgcagttgga aatgttttct cctcggaaaa     300
ccacgcagtg tgaatggact ttcgagagtg ttgttaaatc ctgcgagatt tctggtattt      360
gtggtaaaag catgtaaagt tgtatactga atttgtacgc agtttctaag gcatttcttc     420
ttgtgcacaa gagcaaaaga aaaaagcaa atttatgaa atgacgaaaa actacaaaaa        480
ataaaaaata aaaaaaata agacgtatta ttttggtgg acacgcagac cacggcgtgc       540
aaagcaagtt gttttttgttt tttctaattg ggcagttggg aaacggtgaa aactgtgaag    600
aaaaaaaaca acatttttct ttcttttatgc aataccaatt tggaaatctc gcggccgtgc    660
gtgttttcta gggcgggtgg gattttttga caaatttaga aaagatgcca ccagaaataa    720
cttttttttag atagtgtttt tttttctagt tgttgttgct agagatctttt ttcagaaacg   780
gaacgaaacg aaaaaggaga cctgtgggtg gtggcgatag attaccagat ggtcgagaaa    840
tttttttttg agtatatata caggggtac gtttcagaat tttgaaaacc tattcttcct     900
tctccttaac tcttttatta taattattat attattcatt ttagacttaa aaaccatag      960
aataatattc ttcagtcact cgcttaaaca caaatcaaaa                           1000
```

<210> SEQ ID NO 3
<211> LENGTH: 269
<212> TYPE: DNA
<213> ORGANISM: Kluyveromyces marxianus
<220> FEATURE:
<221> NAME/KEY: IMTT1 terminator
<222> LOCATION: (1)..(269)
<223> OTHER INFORMATION: IMTT1 terminator from K. marxianus

<400> SEQUENCE: 3

```
gaagctttgt tgataaaatc taactactgt ggtatactaa acagttttat attattatta    60
atgaaatttt tcttttaact tttttacaac aacaaccgat aaacacaaac aaccaaaaac    120
caattcaaat taacacaaat agcgaagttg aaaaccttgg attaggcttt cgaagggaat    180
aagttggtgt attttatttt tcaggtgatg ttttttttcgt ctggtacatt gttacatcag    240
tgtttgttcc tttgcttccg tatttgaac                                       269
```

<210> SEQ ID NO 4
<211> LENGTH: 290
<212> TYPE: DNA
<213> ORGANISM: Kluyveromyces marxianus
<220> FEATURE:
<221> NAME/KEY: IMTT2 terminator
<222> LOCATION: (1)..(290)
<220> FEATURE:
<221> NAME/KEY: IMTT2 terminator
<222> LOCATION: (1)..(290)

-continued

<223> OTHER INFORMATION: IMTT2 terminator from K. marxianus

<400> SEQUENCE: 4

```
gttccttatt gatgatttta aatctatgaa aattggggaa agcattttgg aaattttgat      60
ttaaaaagtg atggtttttc aactaatcaa taagcgaaat actcccacaa tttttcgatt     120
gtaggtttat ctttcattac taaatagtgg aaataccacc aacaatacca atatatgaat     180
tatctatatg gaaaatcaat ttttaccatt ctggcttttc tctagttttt atttttttct     240
ttaaacaaat ctttaataat acttattttc taatcaacat atttcagcag                290
```

RECOMBINANT VECTOR FOR HIGH-EXPRESSION OF PROTEINS IN YEASTS

CROSS REFERENCE TO RELATED APPLICATIONS

This application is a national phase of PCT application No. PCT/IN2020/050640, filed Jul. 24, 2020, which claims priority to IN patent application No. 201911030001, filed Jul. 25, 2019 which is incorporated herein by reference thereto.

SEQUENCE LISTING

The instant application contains a Sequence Listing which has been submitted in ASCII format via EFS-Web and is hereby incorporated by reference in its entirety. Said ASCII copy, created on Jan. 23, 2022, is named 217501_Seq.txt and is 4,443 bytes in size.

FIELD OF THE INVENTION

The present invention relates to a recombinant vector for high-expression of proteins in yeast. In particular, the present invention relates to the vector that has promoter sequence and terminator sequence for constitutive expression of homologous and heterologous proteins for industrial and therapeutic use.

BACKGROUND OF THE INVENTION AND DESCRIPTION OF RELATED ART

*Kluyveromyces marxianus* (*K. marxianus*) is a member of the Saccharomycetales yeast. The *K. marxianus* possess various desirable properties required for industrial use such as fastest growth rate among any eukaryotic organism with doubling time of ~70 min, thermotolerance with ability to grow until 52° C., high secretory capacity and ability to assimilate sugars such as glucose, xylose, lactose and inulin. These notable properties make this strain as one of the best choices for various common industrial biotechnological applications such as production of enzymes and alcohol fermentation (Nonklang et al., 2008), (Fonseca et al., 2008). The ability of *K. marxianus* to grow at high temperature is particularly of high value to the fermentation industry, as it reduces the cooling cost as well as the potential risk of contamination.

Attempts have been made to express heterologous proteins and to isolate small molecules such as lactic acid and xylitol (Bae et al., 2017; Kim et al., 2015; Zhang et al., 2015; Zhang et al., 2014) from various strains of yeasts.

To express heterologous proteins in *K. marxianus*, many studies have employed promoters derived from *S. cerevisiae* such as galactokinase (GAL1) (Almeida et al., 2003), glyceraldehyde-3-dehydrogenase (TDH3) (Nonklang et al., 2009), and 3-phosphoglycerate kinase (PGK1) (Ball et al., 1999; Pecota et al., 2007). Among these promoters the GAL1 promoter is galactose regulatable, and other such as TDH3 and PGK are constitutively expressed. The TDH3 and PGK are strong promoters of *K. marxianus* origin that has been attempted for protein expression. (Yang et al., 2015).

The comparative study of promoter's strength (ADH1, TDH3 and PGK) show that the native promoters of *K. marxianus* are stronger than those of the corresponding promoters from *S. cerevisiae* (Yang et al., 2015) paving the need for further exploration of native promoters of *K. marxianus*.

Inulinase promoter (INU1) and GAL1 are strong promoters of *K. marxianus* origin however the promoter strength is carbon source dependent and it gets down-regulated under high glucose concentration (Bergkamp et al., 1993, Gao et al., 2015, Liu et al., 2013, Akada et al., 2014 U.S. Pat. No. 8,846,343). Overall there are only limited numbers of promoters available for use of *K. marxianus* as host strain for protein expression, and thus there is an urgent need to identify new promoters of higher strength than known until now.

To high expression of heterologous proteins terminator play an important role in increase mRNA half-life and improve gene expression (Curran et al., 2013) but in *K. marxianus* most of terminators used in expression vectors is CYC from *S. cerevisiae*. Therefore, there is also need to identify new strong terminators than known until now.

In the present invention, a detailed study of vector with high expression of proteins in yeast using various promoters with and without their native terminators. The present invention provides new promoters and terminators with highest strength among any other expression vectors used in *K. marxianus* not known until now. The invention is useful for efficient and economic production of both homologous and heterologous proteins.

OBJECTIVES OF THE INVENTION

In the view of foregoing, the foremost objective of the present invention is to provide a recombinant vector with high expression of protein in yeast with promoters and terminators identified from *K. marxianus* for high expression of homologous and heterologous proteins.

Another objective of the present invention is to develop vectors with combinations of promoters and terminators from *K. marxianus* for high expression of homologous and heterologous proteins using growth media with different carbon source such as dextrose and xylose.

Yet, another objective of the invention is to develop constitutively high expression promoters with no requirement of additional molecules for inducing protein expression.

SUMMARY OF THE INVENTION

Provided herein are recombinant vectors for high protein expression. In one aspect of the invention, the present invention provides a recombinant vector having promoter sequence and terminator sequence for constitutive expression of homologous and heterologous proteins wherein the promoter sequence is selected from the group consisting of SEQ ID NO: 1 and SEQ ID NO: 2 and terminator sequence having sequence selected from the group consisting of SEQ ID NO: 3 and SEQ ID NO: 4.

In one aspect of the invention, the invention provides the promoter sequence comprises of sequences having at least 70% homology to the SEQ ID NO: 1 or SEQ ID NO: 2.

In yet another aspect of the invention, the present invention provides the vector is used for protein expression in *K. marxianus* and *S. cerevisiae*.

In another aspect of the invention, the present invention provides an expression vector encoding linked to a DNA encoding eGFP or luciferase at its 5' end. In another aspect of the invention, the present invention provides an expression vector encoding terminator linked to a DNA encoding eGFP or luciferase at its 5' end.

In yet another aspect of the invention, the present invention provides a host cell comprising an expression vector for homologous and heterologous genes expression in *K. marxianus* and other yeast cells at a temperature from 20° C. to 45° C.

BRIEF DESCRIPTION OF THE DRAWINGS

FIG. 7 represents the activity of luciferase expressed from indicated combinations of promoters and terminators in *K. marxianus* cultured in growth media with dextrose as carbon source. The *K. marxianus* cells were transformed with plasmid encoding firefly luciferase under control of indicated combinations of promoters and terminators. The overnight grown cells (at 30° C.) in synthetic media containing dextrose (S.D.) were sub cultured in fresh S.D. The cells were grown until cell O.D 600 nm reached around 1. The cells were collected by centrifugation, washed with distilled H$_2$O and resuspended in SD media. To monitor luciferase activity, 50 µl of 1 mg/ml solution of D-Luciferin (Sigma) was added to 200 µl of 0.3 O.D 600 nm cell suspension, and increase in luminescence was monitored in Multimode Plate Readers (TECAN Infinite M200 PRO, Switzerland).

FIG. 8 represents the activity of luciferase expressed from indicated combinations of promoters and terminators in *S. cerevisiae* cultured in growth media with dextrose as carbon source. The *S. cerevisiae* cells were transformed with plasmid encoding firefly luciferase under control of indicated combinations of promoters and terminators. The overnight grown cells in liquid S.D. media at 30° C. were sub cultured into fresh S.D. The cells were grown until O.D.600 nm reached around 1. The cells were collected by centrifugation, washed with distilled H$_2$O and resuspended in S.D. media. To monitor luciferase activity, 50 µl of 1 mg/ml of D-Luciferin (Sigma) was added to 200 µl of 0.3 O.D.600 nm cell suspensions, and increase in luminescence was monitored using Multimode Plate Readers (TECAN Infinite M200 PRO, Switzerland).

DETAILED DESCRIPTION OF THE INVENTION

The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention provides development of recombinant vector(s) for high expression of proteins in yeasts. The present invention provides vector for high expression of proteins in Yeast using strong promoters and terminators to identify promoters and terminators for high expression of homologous or heterologous proteins.

For identification of strong promoter sequences, a large scale transcriptomic data from *K. marxianus* cells grown at various growth conditions was extensively analyzed. The different growth conditions examined are (i) growth using dextrose as carbon source at 30° C. under shaking (ii) growth using dextrose as carbon source at 30° C. under static conditions (iii). growth using dextrose as carbon source at 45° C. under shaking conditions and (iv) growth using xylose as carbon source at 30° C. under shaking conditions (Lertwattanasakul et al., 2015). From the transcriptomic data, some of highly expressed genes were selected to examine the activity of their corresponding promoters.

The GFP was used as a reporter gene, and expressed under the control of the identified promoters. The GFP abundance was examined by monitoring fluorescence as well as its expression level by immunoblotting with anti-GFP antibody. The abundance of GFP expressed under control of selected promoters is examined using immunoblot with anti-GFP antibodies. From these experiments, promoter elements are isolated that allow highest expression of GFP. Furthermore, various combinations of isolated promoters and their corresponding terminators are examined for their ability to support high expression in *K. maxianus* and *S. cerevisiae* using firefly luciferase activity assay which is based on monitoring increase in luminescence in *K. marxianus* and *S. cerevisiae*.

Figure 1:
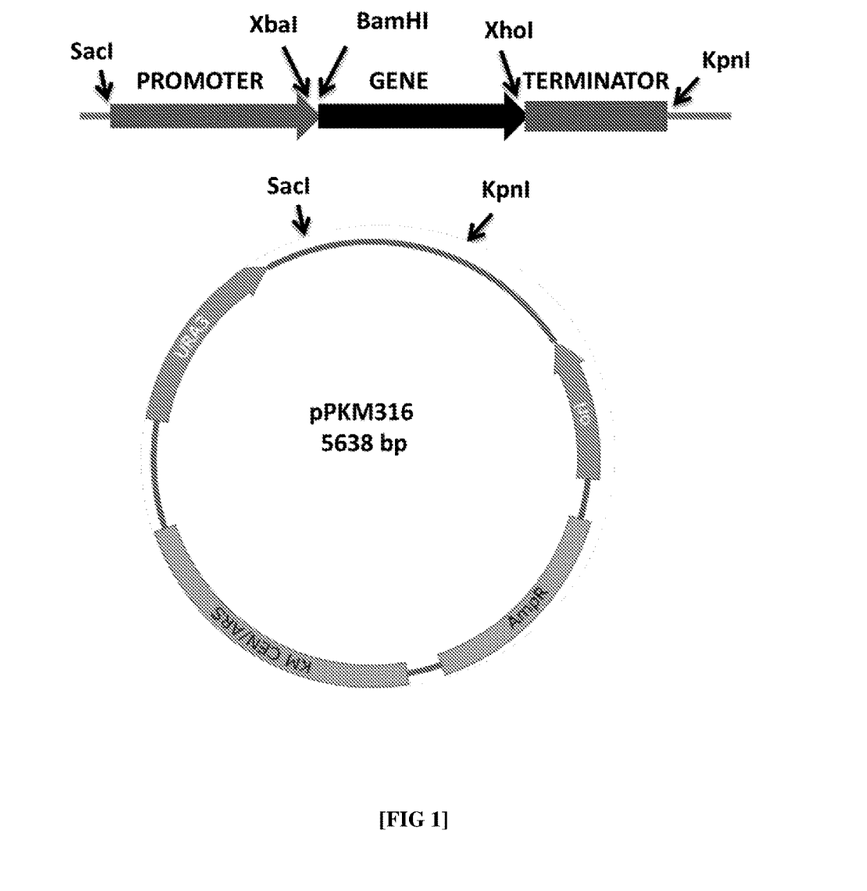
FIG. 1 is a schematic representation of plasmid construction and restriction site used for cloning. The restriction site used for promoter is SacI and XbaI. The restriction sites for terminator is XhoI and KpnI. The gene encoding desired protein is cloned using restriction sites BamHI and XhoI.
Figure 2:
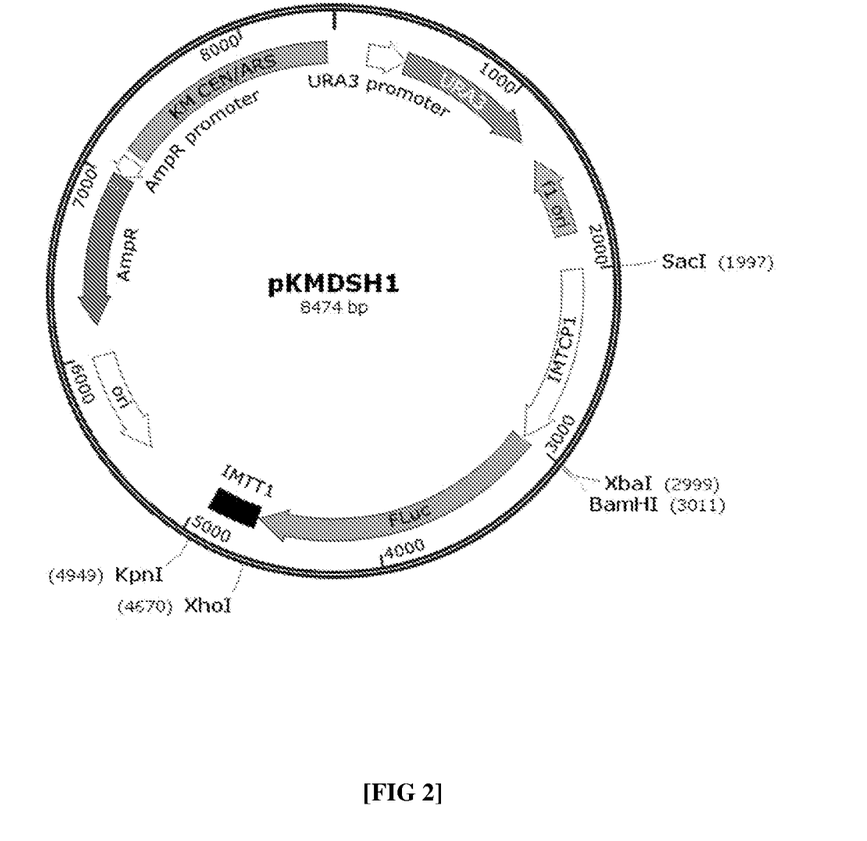
FIG. 2 represents new vector pKMDSH1 (MTCC 25226), map encoding IMTCP1 promoter and IMTT1 terminator. The promoter is subcloned between restriction enzymes sites Sac1 and Xba1 of the vector. The terminator is subcloned between restriction sites XhoI and Kpn1 of the vector. The FLuc gene is subcloned in between restriction sites BamHI and XhoI.
Figure 3:
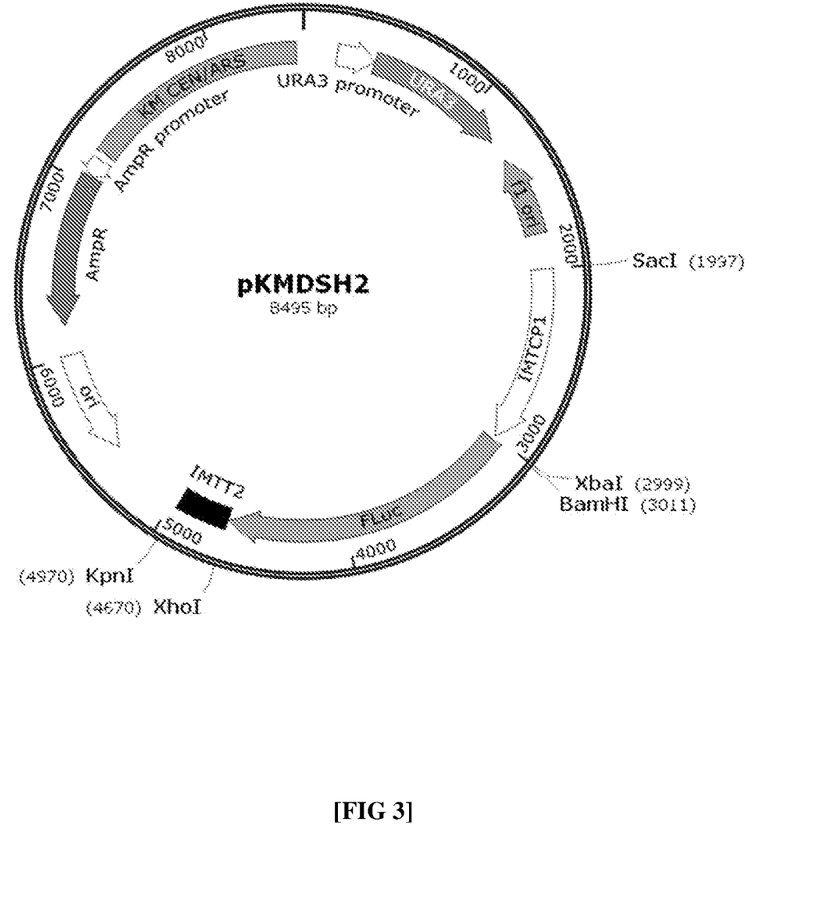
FIG. 3 represents new vector pKMDSH2 (MTCC 25227), map encoding IMTCP1 promoter and IMTT2 terminator. The promoter is subcloned between restriction enzymes sites Sac1 and Xba1 of the vector. The terminator is subcloned between restriction sites XhoI and Kpn1 of the vector. The FLuc gene is subcloned in between restriction sites BamHI and XhoI.
Figure 4:
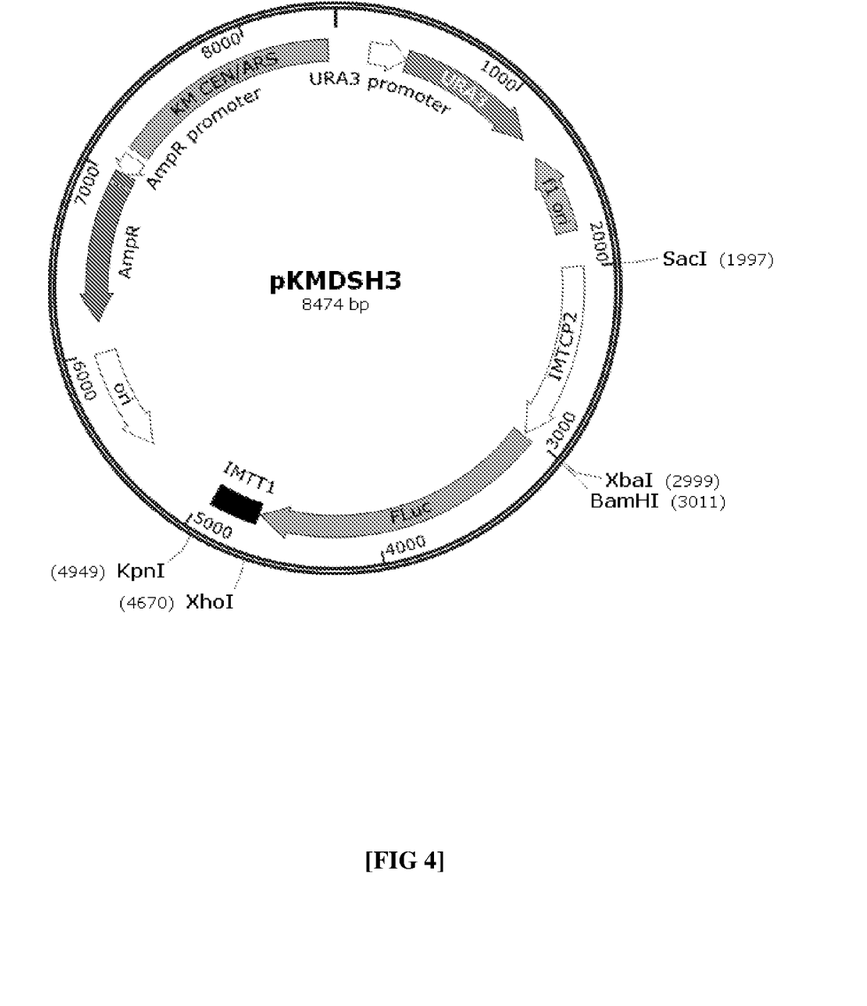
FIG. 4 represents new vector pKMDSH3 (MTCC 25228), map encoding IMTCP2 promoter and IMTT1 terminator. The promoter is subcloned between restriction enzymes sites Sac1 and Xba1 of the vector. The terminator is subcloned between restriction sites XhoI and Kpn1 of the vector. The FLuc gene is subcloned in between restriction sites BamHI and XhoI.
Figure 5:
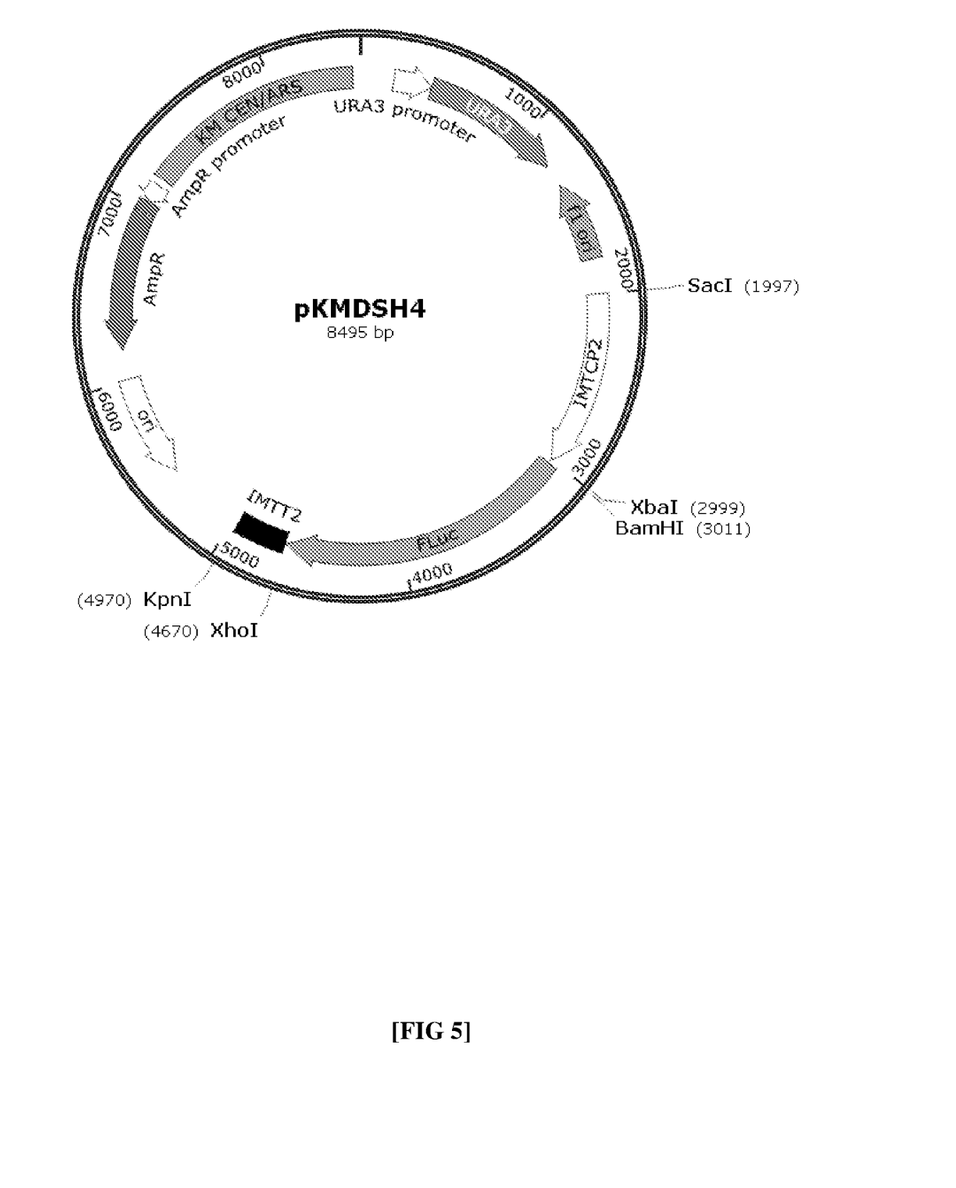
FIG. 5 represents new vector pKMDSH4 (MTCC 25229), map encoding IMTCP2 promoter and IMTT2 terminator. The promoter is subcloned between restriction enzymes sites Sac1 and Xba1 of the vector. The terminator is subcloned between restriction sites XhoI and Kpn1 of the vector. The FLuc gene is subcloned in between restriction sites BamHI and XhoI.
Figure 6:
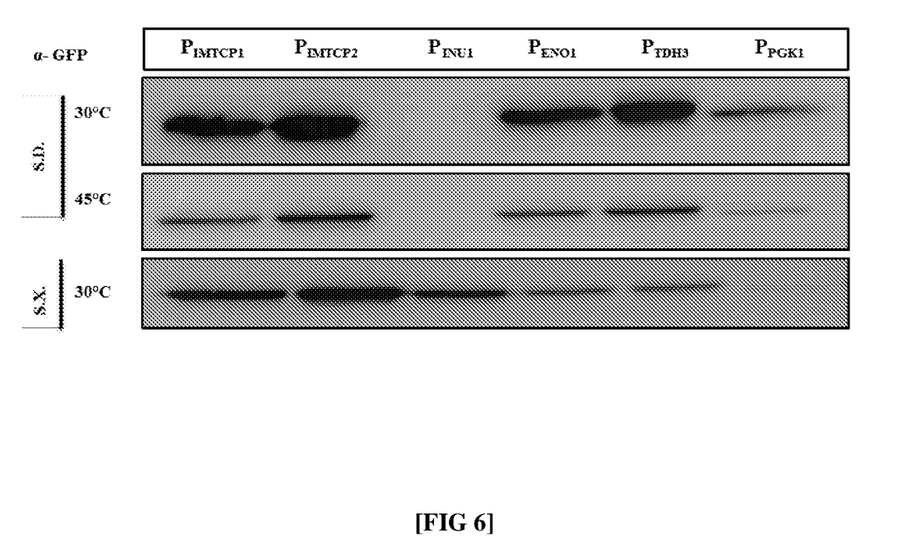
FIG. 6 represents the expression level of GFP under control of different promoters in *K. marxianus*. The *K. marxianus* strain harboring plasmid encoding eGFP under the control of indicated promoters was grown in synthetic media with dextrose as a carbon source at 30° C. and 45° C. or xylose as the carbon source at 30° C. The cells grown overnight were sub cultured in secondary synthetic growth media containing dextrose as a carbon source at 30° C. and 45° C. or xylose as the carbon source at 30° C. The cells were grown at indicated temperature until O.D 600 nm reaches around 1. Cells were harvested by centrifugation at 4000 g for 10 min. The cells were lysed and the lysate was probed on immunoblot using anti-GFP antibodies.

The present invention provides, two promoters including IMTCP1 and IMTCP2. The IMTCP1 is 1000 bp upstream sequence of Gene ID: 34713725. The IMTCP2 is 1000 bp upstream of Gene ID: 34716166. 34716166. Both the promoters have the strong activity as compared to any of the other known native promoters INU1, ENO1, TDH3 and PGK1 of *K. marxianus* (FIG. 6).

In one embodiment, the expression is improved under control of different terminator sequences like IMTT1 and IMTT2. The IMTT1 is 269 bp downstream sequence of Gene ID: 34713725. The IMTT2 is 290 bp downstream sequence of Gene ID:34716166. The IMTT1 and IMTT2 are used in combination with IMTCP1 or IMTCP2 to express gene encoding Firefly luciferase. The cellular abundance of Firefly Luciferase expressed under the control of combinations of IMTCP1 or IMTCP2 promoter with different terminators was examined by measuring luminescence as reporter of luciferase activity.

In another embodiment, the combination of promoters and terminators for high level expression of proteins: (1) IMTCP1 and IMTT1 (2) IMTCP1 and IMTT2 (3) IMTCP2 and IMTT1 (4) IMTCP2 and IMTT2 is provided.

In another embodiment, the IMTCP1 promoter is represented by SEQ ID NO: 1 or having an identity at least about 70% or more to SEQ ID NO: 1 and having a promoter activity in *K. marxianus* and at least one or more yeasts like *S. cerevisiae* other than *K. marxianus*.

A polynucleotide having a substitution, deletion or addition of at least one or more nucleotides in the polynucleotide represented by SEQ ID NO: 1 and having a promoter activity in *K. marxianus* and at least one or more yeasts like *S. cerevisiae* other than *K. marxianus*.

In another embodiment, the IMTCP2 promoter is represented by SEQ ID NO: 2 or having an identity at least about 70% or more to SEQ ID NO: 2 and having a promoter activity in *K. marxianus* and at least one or more yeasts like *S. cerevisiae* other than *K. marxianus*. A polynucleotide having a Substitution, deletion or addition of at least one or more nucleotides in the polynucleotide represented by SEQ ID NO: 2 and having a promoter activity in *K. marxianus* and at least one or more yeasts like *S. cerevisiae* other than *K. marxianus*.

In another embodiment, the promoter of invention is located on an expression vector in correct reading frame of a heterologous polynucleotides or a translational start codon adjacent to a restriction site.

In another embodiment, the present invention provides the polynucleotide sequences of terminators: The IMTT1 terminator is represented by SEQ ID NO: 3 or having an identity at least about 70% or more to SEQ ID NO: 3 and having a terminator activity in *K. marxianus* and at least one or more yeasts like *S. cerevisiae* other than *K. marxianus*. A polynucleotide having a substitution, deletion or addition of at least one or more nucleotides in the polynucleotide represented by SEQ ID NO: 3 and having a terminator activity in *K. marxianus* and at least one or more yeasts like *S. cerevisiae* other than *K. marxianus*.

In another embodiment, the IMTT2 terminator is represented by SEQ ID NO: 4 or having identity of at least about 70% or more to SEQ ID NO: 4 and having terminator activity in *K. marxianus* and at least one or more yeasts like *S. cerevisiae* other than *K. marxianus*. A polynucleotide having a substitution, deletion or addition of at least one or more nucleotides in the polynucleotide represented by SEQ ID NO: 4 and having a terminator activity in *K. marxianus* and at least one or more yeasts like *S. cerevisiae* other than *K. marxianus*.

The polynucleotide sequence of terminator of the invention is located on an expression vector downstream of heterologous polynucleotides or after stop codon of the gene adjacent a restriction site.

In another embodiment, a hybrid vector in present invention is provided having one or multiple DNA inserts or a desired polypeptide encoded by a DNA sequence or a gene under control of promoter of invention of SEQ ID NO: 1, SEQ ID NO: 2 and terminator of SEQ ID NO: 3, SEQ ID NO: 4. The vector of invention encodes features such as suitable restriction sites for cloning DNA, replication in host, a selective genetic marker, yeast replication origin.

The plasmids of invention possess autonomously replicating segment (ARS) of *K. marxianus* origin for maintenance in the host cell post transformation. The promoter and terminator activity in a polynucleotide sequence are evaluated using a reporter assay measuring steady state level of gene product subcloned between the promoter and terminator. In the reporter assay, a reporter gene encoding a protein product is expressed under the control of the promoter with terminator sequence at its 3' end. A reporter gene (encoding a reporter protein, for example green fluorescent protein (GFP) (Bierhuizen et al., 1997) and luciferase (Himes and Shannon, 2000) is cloned in between promoter and terminator in a hybrid plasmid. The plasmid is transformed into a yeast host, and the abundance of the expressed protein could be measured using a biochemical assay or on immunoblot with appropriate antibody.

In one embodiment, the application provides *K. marxianus* promoters $P_{IMTCP1}$ and PJMTCP2 (as represented by SEQ ID NO: 1 and SEQ ID NO: 2). The strength of the promoters is than compared with known *K. marxianus* promoters (INU1, ENO1, TDH3 and PGK1). The promoter strength is compared by measuring the steady state level of eGFP, expressed under the control of various promoters. First, gene encoding eGFP is subcloned at 5' end of nucleotide sequence of *S. cerevisiae* CYC terminator.

In another embodiment of the present invention, the promoters of the present invention, IMTCP1, IMTCP2, and other known promoter are subcloned to 5' end of gene encoding eGFP resulting in the design of various expression vector harboring nucleotide cassettes such as $P_{IMTCP1}$-eGFP-$T_{CYC}$, $P_{IMTCP2}$-eGFP-$T_{CYC}$, $P_{INU1}$-eGFP-$T_{CYC}$, $P_{ENO1}$-eGFP-$T_{CYC}$, $P_{TDH3}$-eGFP-$T_{CYC}$ and $P_{PGK1}$-eGFP-$T_{CYC}$. The designed vectors were transformed in a URA3 (Uracil auxotrophic strain) auxotrophic strain of *K. marxianus*.

In another embodiment, the transformants are selected onto solid SD (Sabouraud agar) agar plate without uracil. 4-5 transformants obtained are pooled, and grown in S.D. media at 30° C. The overnight grown culture was diluted 100 fold into fresh growth media containing dextrose or Xylose as carbon source, and the culture was grown at 30-45° C. To mid-log phase Cells are collected by centrifugation, washed with PBS buffer. The cells are lysed and equal amount of total proteins in whole cell lysate is used for detection of protein expression on an immunoblot by anti-GFP antibody.

In an embodiment of the present invention it provides a recombinant vector having promoter sequence and terminator sequence for constitutive expression of homologous and heterologous proteins wherein the promoter sequence is selected from the group consisting of SEQ ID NO: 1 and SEQ ID NO: 2 and terminator sequence having sequence selected from the group consisting of SEQ ID NO: 3 and SEQ ID NO: 4.

In yet another embodiment the invention provides a promoter sequence comprises of sequences having at least 70% homology to the SEQ ID NO: 1 or SEQ ID NO: 2.

In yet another embodiment the invention provides a terminator sequence comprises of sequences having at least 70% sequence homology to SEQ ID NO: 3 or SEQ ID NO: 4.

In yet another embodiment the invention provides a vector selected from the group comprising of vectors used for protein expression in *K. marxianus* and *S. cerevisiae*.

In yet another embodiment the invention provides a promoter and terminator sequence linked to a DNA encoding any protein selected from the group comprising of proteins such as eGFP and luciferase.

In yet another embodiment the invention provides an expression vector useful for homologous and heterologous genes expression in yeast wherein the yeast is selected from the group comprising of *K. marxianus* and *S. cerevisiae*.

In yet another embodiment the invention provides a host cell having the recombinant vector.

In one embodiment, the present invention provides a method of isolation of promoters with activity higher than any of the other known *K. marxianus* promoters.

In another embodiment, the present invention further validates and quantifies the strength of different combination of promoters and terminators using in vivo luciferase assay. The gene encoding eGFP is replaced with that encoding Luciferase (FLuc) from the firefly *Photinus pyralis* in various designed pPKM316 FLuc CYC.

In another embodiment, CYC termination sites are replaced with newly identified terminators IMTT1 and IMTT2.

In another embodiment, a different combination of promoters and terminators such as $P_{IMTCP1}$-FLuc-$T_{IMTT1}$, $P_{IMTCP1}$-FLuc-$T_{IMTT2}$, $P_{IMTCP2}$-FLuc-$T_{IMTT1}$ and $P_{IMTCP2}$-FLuc-$T_{IMTT2}$ is provided. The strength of the promoters is compared with previously known strong promoters PGK in combination with termination CYC.

In another embodiment, the polynucleotides comprising of these cassettes are cloned in plasmid pPKM316. The resulting plasmids are individually transformed into *K. marxianus*. The transformants were grown in liquid growth media. The overnight grown cells are diluted 100-fold in fresh growth media and grown further at 30° C. until mid-log phase. Cells are collected by centrifugation and re-suspended in Yeast Nitrogen Base (YNB) media. The luciferase expression is measured by monitoring luminescence. 50 µl of 1 mg/ml D-Luciferin is added to 200 µl of 0.3 O.D. cells, and luminescence was measured in Multimode Plate Readers (TECAN Infinite M200 PRO, Switzerland).

Figure 7:
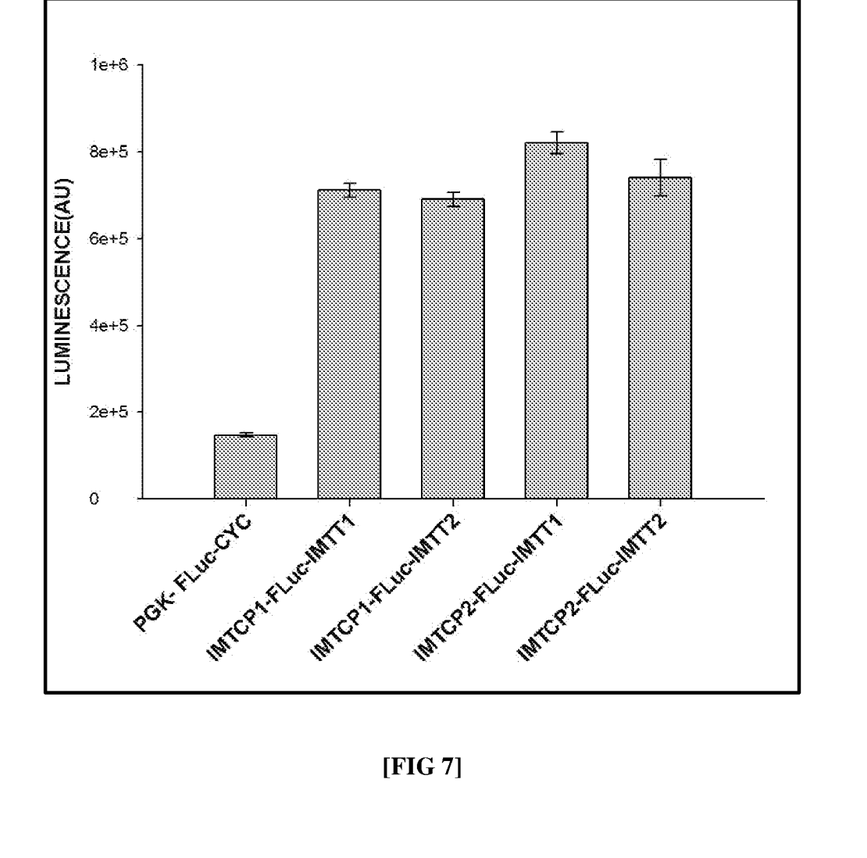

In yet another embodiment of the present invention provides a combination of promoters and terminators provide high strength for protein expression as compared to previous known promoters and terminators. Combination of promoter IMTCP2 and terminator IMTT1 show highest expression strength as compared to previous known combination of promoter PGK1 and terminator CYC expression (FIG. 7).

In the present invention, the promoters and terminators from *K. marxianus* to commonly used *S. cerevisiae* promoter like GPD and commonly used *S. cerevisiae* terminator CYC in *S. cerevisiae* are compared. Suitable promoters and transcriptional terminators may be cloned into shuttle vectors, and transformed into yeast cells. The different combinations of promoter and terminator such as $P_{IMTCP1}$-FLuc-$T_{IMTT1}$ (promoter IMTCP1 with terminator IMTT1), $P_{IMTCP1}$-FLuc-$T_{IMTT2}$ (promoter IMTCP1 with terminator IMTT2), $P_{IMTCP2}$-FLuc-$T_{IMTT1}$ (promoter IMTCP2 with terminator IMTT1), $P_{IMTCP2}$-FLuc-$T_{IMTT2}$ (promoter IMTCP2 with terminator IMTT2) and S.C.$_{GPD}$-FLuc-$T_{CYC}$ (promoter GPD with terminator CYC) are constructed. These constructs are subcloned into a shuttle vector like pRS316. The designed plasmids with these constructs were transformed into *S. cerevisiae* strain BY4741. Cells were grown in liquid growth media at 30° C. The cells are collected, and resuspended in YNB media. The luciferase expression is measured by monitoring luminescence. 50 µl of 1 mg/ml D-Luciferin was added to 200 µl of 0.3 O.D. cells, and luminescence was measured in Multimode Plate Readers (TECAN Infinite M200 PRO, Switzerland).

Figure 8:
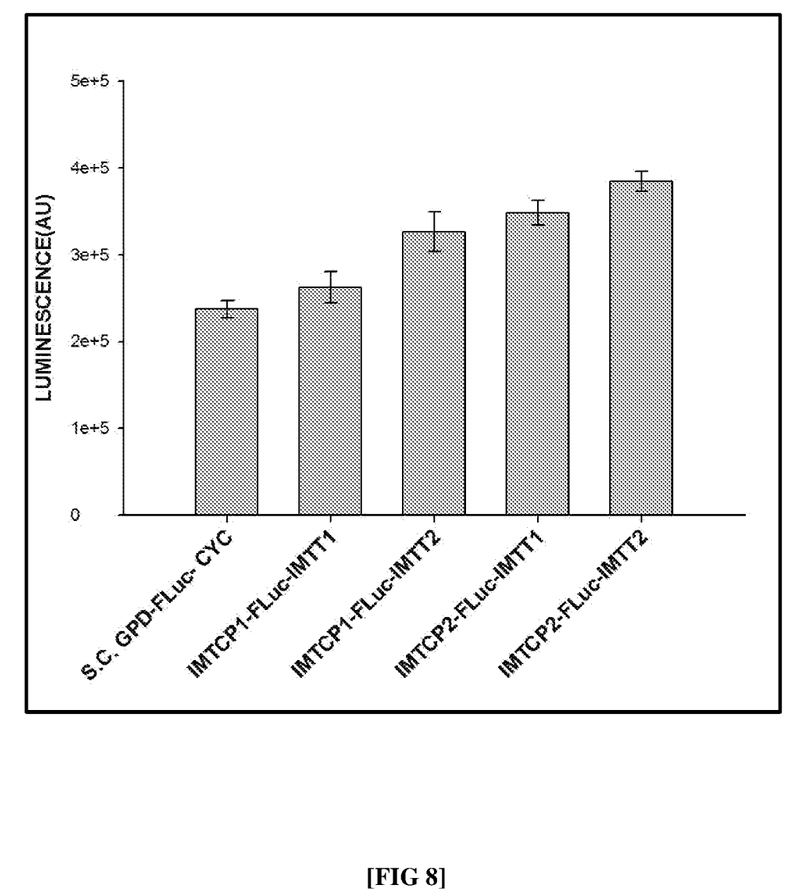

Accordingly, the present invention provides a combination of promoters and terminators of this invention are active in *S. cerevisiae* or have high strength for protein expression as compared to previously known combination of promoters and terminators in *S. cerevisiae* (FIG. 8).

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions. The following examples are given by way of illustration therefore should not be construed to limit the scope of the invention.

Example 1

Construction of *K. marxianus* Strain with Uracil Auxotrophy

A *K. marxianus* Uracil auxotroph was constructed to use uracil as a selectable marker. For this, a DNA sequence having homology 250 base pair (bp) upstream and 250 bp downstream of *K. marxianus* URA3 gene was designed, and the cassette with designed DNA sequence was synthesized from GenScript USA, Inc. This cassette was transformed in *K. marxianus* (NBRC 1777) and desired uracil auxotrophs were selected on the basis of their ability to grow onto solid growth media containing 5-fluoroorotic acid (5-FOA).

Example 2

2.1: Preparation of the Expression Vector

The integrating shuttle vector plasmid pRS306 (ATCC 77141) was used as a backbone for construction of recombinant yeast expression vector. First, 1265 DNA bases of Autonomously Replicating Sequence/Centromere sequence (ARS/CEN) was amplified from the genomic DNA of *K. marxianus* strain NBRC1777 using forward and reverse primers consisting of nucleotides 40 bp upstream and 40 bp downstream respectively of ARS/CEN origin sequence of *K. marxianus*. Purified amplified product was inserted into the vector pRS306 (Addgene #15831) by Transfer-PCR method (Erijman et al., 2011). The resultant expression vector is referred to as pPKM316.

2.2: Construction of pPKM316-eGFP-$T_{CYC}$

The gene encoding enhanced green fluorescent protein (Egfp) was subcloned into plasmid pPKM316. The ORF corresponding to eGFP (Addgene #40822) was digested with restriction enzymes BamHI and XhoI, and subsequently ligated into vector pKM316 (digested with the same restriction enzymes) to construct pPKM316-eGFP. The CYC terminator from *S. cerevisiae* was digested with restriction enzymes XhoI and KpnI, and then ligated at the 3' end of gene encoding eGFP into pPKM316-eGFP to construct pPKM316-eGFP-$T_{CYC}$.

2.3: Insertion of Promoter Sequence into pPKM316-eGFP-T$_{CYC}$

The DNA sequence encoding promoters such as IMTCP1, IMTCP2, INU1, ENO1, TDH3 and PGK1 were PCR amplified from genomic DNA of *K. marxianus* strain NBRC1777 using promoter specific forward and reverse primers. The amplified DNA sequences were digested with restriction enzymes SacI and XbaI. The digested product was ligated into pPKM316-eGFP-T$_{CYC}$ to construct vectors pPKM316-P$_{IMTCP1}$-eGFP-T$_{CYC}$, pPKM316-P$_{IMTCP2}$-eGFP-T$_{CYC}$, pPKM316-P$_{INU1}$-eGFP-T$_{CYC}$, pPKM316-P$_{ENO1}$-eGFP-T$_{CYC}$, pPKM316-P$_{TDH3}$-eGFP-T$_{CYC}$ and pPKM316-P$_{PGK1}$-eGFP-T$_{CYC}$.

Example 3

Promoter Strength Analysis of eGFP by Weston Blots

Western blots analysis of eGFP was performed on whole cell extracts of NBRC1777: ΔURA3 strains harboring plasmids like pPKM316-P$_{IMTCP1}$ eGFP-T$_{CYC}$, pPKM316-P$_{IMTCP2}$-eGFP-T$_{CYC}$, pPKM316-P$_{INU1}$-eGFP-T$_{CYC}$, pPKM316-P$_{ENO1}$-eGFP-T$_{CYC}$, pPKM316-P$_{TDH3}$-eGFP-T$_{CYC}$ and pPKM316-P$_{PGK1}$-eGFP-T$_{CYC}$.

Positive cells were grown in YNB+ glucose (S.D.) medium at 30° C. Overnight grown primary culture was re-inoculated at 0.05 O.D.$_{600nm}$ into YNB+glucose and YNB+xylose (S.X.) medium and grown further at 30-45° C. to mid-log phase. At this stage, cells were collected by centrifugation washed with 1×PBS buffer. The cells were lysed using glass beads by mechanical beating. For immunoblotting 10 µg of total protein from whole cell lysate was subjected to electrophoresis on a 12% SDS polyacrylamide gel and transferred to a PVDF membrane by electro-blotting. A 1:5000 dilution of an anti-GFP mouse antiserum (cat. No. MA5-15256; thermo fisher scientific) was followed by a secondary incubation with a 1:5000 dilution of goat anti-mouse antibody conjugated to Horseradish peroxidase. (cat. no. 7076; Cell Signaling Technology, Inc.).

Example 4

Examination of Promoter Strength Using Luciferase Assay

To further examine the promoters strength, the luciferase gene (FLuc) (Addgene #24942) from firefly *Photinus pyralis* was subcloned downstream of promoters pPKM316-P$_{IMTCP1}$-FLuc-T$_{IMTT1}$ (pKMDSH1), pPKM316-P$_{IMTCP1}$-FLuc-T$_{IMTT2}$ (pKMDSH2), pPKM316-P$_{IMTCP2}$-FLuc-T$_{IMTT1}$ (pKMDSH3), pPKM316-P$_{IMTCP2}$-FLuc-T$_{IMTT2}$ (pKMDSH4) and pPKM316-P$_{PGK1}$-FLuc-T$_{CYC1}$ using restriction sites BamHI and XhoI. The constructed plasmids were transformed into *K. marxianus*. The 3-4 transformants were pooled and grown overnight into liquid growth media lacking uracil with dextrose as source of carbon. The overnight grown primary culture was diluted 100-fold into 20 ml of fresh growth media with dextrose as carbon source at temperatures ranging from 30° C. until mid-exponential phase. The cells were harvested by centrifugation and re-suspended in 1 ml of YNB media. The luciferase expression was monitored as a function of luciferase activity. For measuring luciferase activity, 200 µl of 0.3 OD cells were added with 50 µl of 1 mg/ml D-Luciferin (Sigma-Aldrich), and the luminescence was measured in Multimode Plate Readers (TECAN Infinite M200 PRO, Switzerland). All reagents were prepared as described by the manufacturer (Sigma-Aldrich). To study of these promoters and terminators in *S. cerevisiae* same construct was cloned in pRS316 (ATCC 77145).

Advantages of Invention

1. The construction of vector for higher expression of protein in diversity of yeast species.
2. The identified IMTCP2 promoter and IMTT1 terminator (pKMDSH3) having 5.54-fold higher expression then previously known strong PGK promoter with CYC terminator in *K. marxianus*.
3. The identified IMTCP2 promoter and IMTT2 terminator (pKMDSH4) having 1.65-fold higher expression then previously known strong GPD promoter with CYC terminator in *S. cerevisiae*.
4. The identified promoters and terminators have higher expression of protein in high temperature like 45° C.
5. The identified promoters and terminators have higher expression in different sugars condition like pentose and hexose sugars where as some promoters like INU1 and GAL1 are gets down-regulated under high glucose concentration.

REFERENCES

1. Almeida, C., Queiros, O., Wheals, A., Teixeira, J., Moradas, F. P. (2003) Acquisition of flocculation phenotype by *Kluyveromyces marxianus* when overexpressing GAP1 gene encoding an isoform of glyceraldehyde-3-phosphate dehydrogenase. J Microbiol Methods 55(2):433-440.
2. Bae, J. H., Kim, H. J., Kim, M. J., Sung, B. H., Jeon, J. H., Kim, H. S., Jin, Y. S., Kweon, D. H., Sohn, J. H. (2017) Direct fermentation of Jerusalem artichoke tuber powder for production of L-lactic acid and D-lactic acid by metabolically engineered *Kluyveromyces marxianus*. J. Biotechnol. 266, 27-33.
3. Ball, M. M., Raynal, A., Guerineau, M., Iborra, F. (1999) Construction of efficient centromeric, multicopy and expression vectors for the yeast *Kluyveromyces marxianus* using homologous elements and the promoter of a purine-cytosine-like permease. J Mol Microbio Biotechnol 1(2):347-353.
4. Bergkamp, R. J., Bootsman, T. C., Toschka, H. Y., Mooren, A. T., Kox, L., Verbakel, J. M., Geerse, R. H., Planta, R. J. (1993) Expression of an α-galactosidase gene under control of the homologous inulinase promoter in *Kluyveromyces marxianus*. Appl MicrobiolBiotech 40(2-3):309-317.
5. Bierhuizen, M. F., Westerman, Y., Visser, T. P., Wognum, A. W., Wagemaker, G. (1997) Green fluorescent protein variants as markers of retroviral-mediated gene transfer in primary hematopoietic cells and cell lines. Biochem Biophy's ResCommun, 234, 371-375.
6. Curran K. A., Karim A. S., Gupta A., Alper H. S. (2013) Use of expression-enhancing terminators in *Saccharomyces cerevisiae* to increase mRNA half-life and improve gene expression control for metabolic engineering applications. Metab Eng. 19:88-97
7. Erijman, A., Dantes, A., Bernheim, R., Shifman, J. M. and Peleg, Y. (2011) Transfer-PCR (TPCR): a highway for DNA cloning and protein engineering. J. Struct. Biol., 175, 171-177.
8. Fonseca, G. G., Heinzle, E., Wittmann, C., Gombert, A. K. (2008). The yeast *Kluyveromyces marxianus* and its biotechnological potential. Appl. Microbiol. Biotechnol. 79: 339-345.
9. Gao, J. Q., Yuan, W. J., Kong, L., Xiang, R. J., Zhong, S. J. (2015) Efficient ethanol production from inulin by two-stage aerate strategy. Biomass Bioenerg 80: 10-16.

10. Himes, S. R., Shannon, M. F. (2000) Assays for transcriptional activity based on the luciferase reporter gene. Methods Mol Biol, 130, 165-174.
11. Kim, J. S., Park, J. B., Jang, S. W., Ha, S. J. (2015). Enhanced xylitol production by mutant *Kluyveromyces marxianus* 36907-FMEL1 due to improved xylose reductase activity. *Applied biochemistry and biotechnology*, 176(7), 1975-1984.
12. Lertwattanasakul, N., Kosaka, T., Ho soyama, A., Suzuki, Y., Rodrussamee, N., Matsutani, M. (2015) Genetic basis of the highly efficient yeast *Kluyveromyces marxianus*: complete genome sequence and transcriptome analyses. Biotechnol Biofuels 8:1-14.
13. Liu, G. L., Chi, Z., Chi, Z. M. (2013) Molecular characterization and expression of microbial inulinase genes. Crit Rev Microbiol 39(2):152-165.
14. Nonklang, S., Ano, A., Abdel-Banat, B. M. A., Saito, Y., Hoshida, H., Akada, R. (2009) Construction of flocculent *Kluyveromyces marxianus* strains suitable for high-temperature ethanol fermentation. Biosci Biotech Bioch 73(5):1090-1095
15. Nonklang, S., Abdel-Banat, B. M., Cha-aim, K., Moonjai, N., Hoshida, H., Limtong, S., Yamada, M., Akada, R. (2008) High-temperature ethanol fermentation and transformation with linear DNA in the thermotolerant yeast *Kluyveromyces marxianus* DMKU3-1042. Appl Environ Microbiol 74: 7514-7521.
16. Pecota, D. C., Rajgarhia, V., Da Silva, N. A. (2007) Sequential gene integration for the engineering of *Kluyveromyces marxianus*. J Biotech 127(3):408-416.
17. Yang, C., Hu, S., Zhu, S., Wang, D., Gao, X., Hong, J. (2015). Characterizing yeast promoters used in *Kluyveromyces marxianus*. *World Journal of Microbiology and Biotechnology*, 31(10), 1641-1646.
18. Zhang, J., Zhang, B., Wang, D., Gao, X., Hong, J. (2014) Xylitol production at high temperature by engineered *Kluyveromyces marxianus*. Bioresour. Technol., 152, 192-201.
19. Zhang, J., Zhang, B., Wang, D., Gao, X., Hong, J. (2015). Improving xylitol production at elevated temperature with engineered *Kluyveromyces marxianus* through over-expressing transporters. *Bioresource technology*, 175, 642-645.

Patent

1. U.S. Pat. No. 8,846,343, Akada et al., 2014

We claim:

1. A recombinant vector having a promoter sequence and a terminator sequence for constitutive expression wherein the promoter sequence is set forth in SEQ ID NO: 1 or SEQ ID NO: 2, and the terminator sequence is set forth in SEQ ID NO: 3 or SEQ ID NO: 4.

2. The recombinant vector of claim 1, wherein the promoter sequence is SEQ ID NO: 1.

3. The recombinant vector of claim 1, wherein the terminator sequence is SEQ ID NO: 3.

4. The recombinant vector of claim 1, wherein the promoter and terminator sequence are linked to a DNA encoding a protein.

5. The recombinant vector of claim 1, wherein the vector is used for homologous and heterologous gene expression in K. marxianus.

6. An isolated host cell comprising a recombinant vector according to claim 1.

7. The recombinant vector of claim 1, wherein the vector is used for homologous and heterologous gene expression in S. cerevisiae.

8. The recombinant vector of claim 4, wherein the protein is eGFP.

9. The recombinant vector of claim 4, wherein the protein is luciferase.

10. The recombinant vector of claim 2, wherein the terminator sequence is SEQ ID NO: 3.

11. The recombinant vector of claim 2, wherein the terminator sequence is SEQ ID NO: 4.

12. The recombinant vector of claim 1, wherein the promoter sequence is SEQ ID NO: 2.

13. The recombinant vector of claim 12, wherein the terminator sequence is SEQ ID NO: 3.

14. The recombinant vector of claim 12, wherein the terminator sequence is SEQ ID NO: 4.

15. The recombinant vector of claim 1, wherein the terminator sequence is SEQ ID NO: 4.

* * * * *